(12) United States Patent
Peloquin et al.

(10) Patent No.: US 9,819,132 B2
(45) Date of Patent: Nov. 14, 2017

(54) SYSTEM FOR ENHANCING POWER TOOLS WITH AN ADAPTER

(71) Applicant: Black & Decker Inc., New Britain, CT (US)

(72) Inventors: Ryan H. Peloquin, Ellicott City, MD (US); Andrew E. Seman, Jr., Pylesville, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/413,507

(22) Filed: Jan. 24, 2017

(65) Prior Publication Data

US 2017/0222382 A1    Aug. 3, 2017

Related U.S. Application Data

(60) Provisional application No. 62/288,127, filed on Jan. 28, 2016.

(51) Int. Cl.

| H01R 31/06 | (2006.01) |
|---|---|
| H01R 27/02 | (2006.01) |
| H01M 2/10 | (2006.01) |
| G05B 15/02 | (2006.01) |
| H01R 11/28 | (2006.01) |
| H01R 24/54 | (2011.01) |

(52) U.S. Cl.
CPC ........... *H01R 31/065* (2013.01); *H01R 27/02* (2013.01); *G05B 15/02* (2013.01); *H01M 2/1044* (2013.01); *H01R 11/281* (2013.01); *H01R 24/54* (2013.01); *H01R 31/06* (2013.01)

(58) Field of Classification Search
CPC ...... H01R 24/54; H01R 31/06; H01R 11/281; H01M 2/1044; G05B 15/02
USPC .................................. 439/638, 500; 700/297
See application file for complete search history.

(56) References Cited

U.S. PATENT DOCUMENTS

| 6,876,173 B2 * | 4/2005 | Mastaler ............... H02J 7/0045 |
|---|---|---|
| | | 320/114 |
| 7,443,137 B2 | 10/2008 | Scott et al. |
| 2013/0141217 A1 | 6/2013 | Goren et al. |
| 2014/0107853 A1* | 4/2014 | Ashinghurst ........ G05B 19/048 |
| | | 700/297 |
| 2014/0213301 A1 | 7/2014 | Evans et al. |

* cited by examiner

*Primary Examiner* — Abdullah Riyami
*Assistant Examiner* — Justin Kratt
(74) *Attorney, Agent, or Firm* — Adan Ayala

(57) ABSTRACT

An adapter for electrically connecting a power tool battery pack with a power tool and/or a power tool battery pack charger. The adapter has a controller, and a wireless communication circuit connected to the controller for wireless communication with a computing device, the wireless communication circuit receiving data from the computing device. The controller can perform an action according to the data received from the computing device.

14 Claims, 5 Drawing Sheets

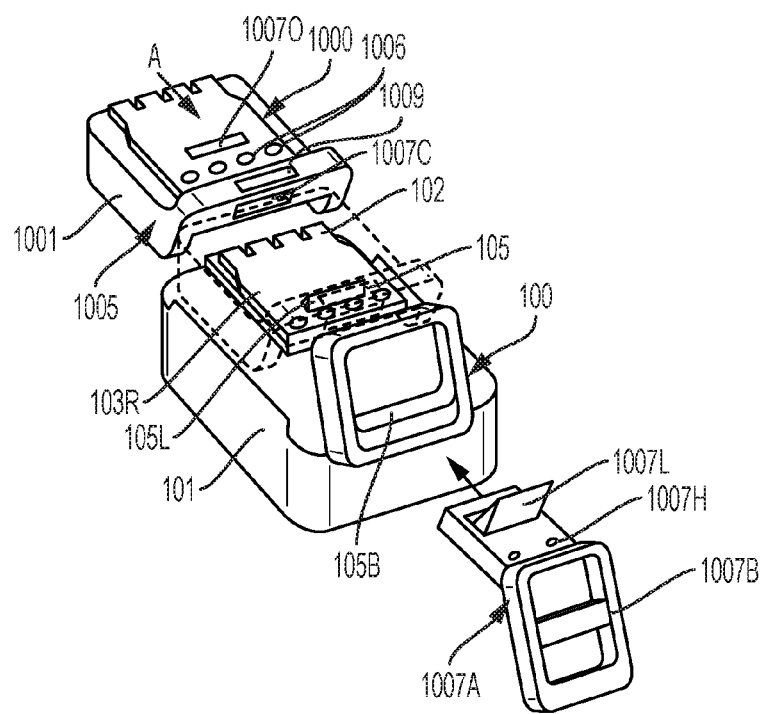
FIG. 3A
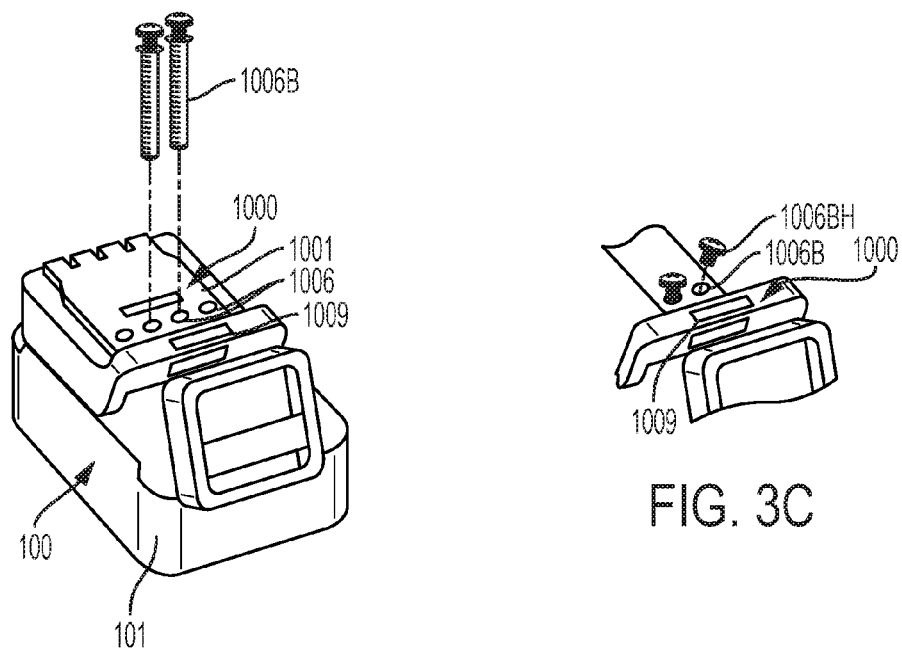
FIG. 3B
FIG. 3C

SYSTEM FOR ENHANCING POWER TOOLS WITH AN ADAPTER

CROSS-REFERENCE TO RELATED APPLICATIONS

The present application derives priority from U.S. Patent Application No. 62/288,127, filed Jan. 28, 2016, which is hereby wholly incorporated by reference.

FIELD OF THE INVENTION

The present invention relates to a system for enhancing power tools and particularly a system for wirelessly enhancing power tools.

BACKGROUND

It is desirable to rapidly and efficiently modify attributes of power tools to better match the jobsite application. For example, it may be preferable to change the blade speed in a circular saw in order to better cut a particular material. US Publication No. 2014/0107853 teaches a power tool, a power tool battery pack, a power tool battery pack charger, a non-motorized sensing tool and/or a portable power source can be provided with a communication circuit to enable such devices to communicate and interact with a computing device, which would allow for the quick modification of attributes for such devices.

However, such solution is implementable within the actual devices. Accordingly, it could be difficult to retrofit an older power tool, power tool battery pack, power tool battery pack charger, non-motorized sensing tool and/or portable power source to include such communication circuit.

SUMMARY

An adapter for electrically connecting a power tool battery pack with at least one of a power tool and a power tool battery pack charger, where the power tool battery pack has a first set of terminals, and the at least one of a power tool and a power tool battery pack charger has a second set of terminals, the adapter comprising a third set of terminals for electrically connecting with the first set of terminals, a fourth set of terminals for electrically connecting with the second set of terminals, a controller connected to the third and fourth set of terminals, and a wireless communication circuit connected to the controller.

BRIEF DESCRIPTION OF THE DRAWINGS

FIG. 3A is a perspective view showing the adapter of FIG. 1 being installed on a power tool battery pack.

FIG. 3B is a perspective view showing a further installation step for installing the adapter of FIG. 3A on a power tool battery pack.

FIG. 3C is a partial perspective view showing a further installation step for installing the adapter of FIG. 3B on a power tool battery pack.

DETAILED DESCRIPTION

Figure 1:
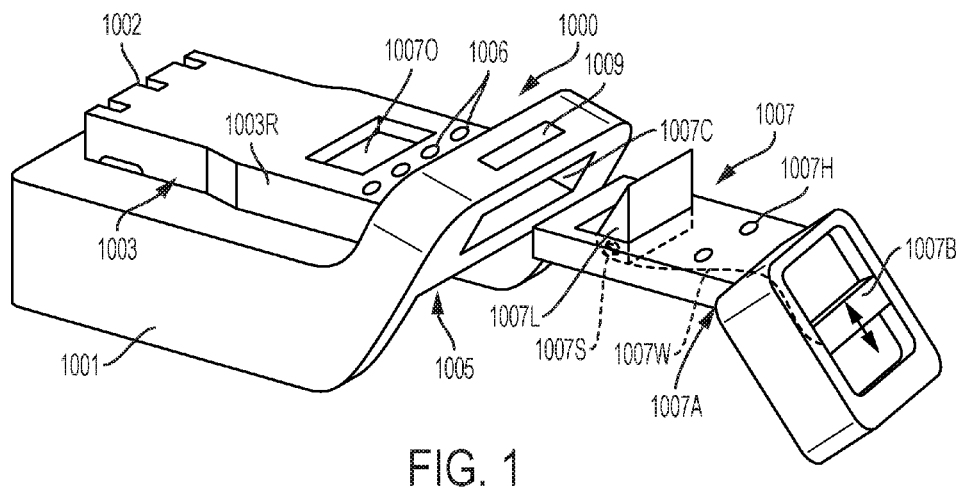
FIG. 1 is a perspective view of an adapter for enhancing a power tool, a power tool battery pack and/or a power tool battery pack charger according to the invention.

FIGS. 1-5 illustrate an exemplary adapter 1000 for enhancing power tools 200, power tool battery packs 100 and/or chargers 210. The teachings of US Publication No. 2014/0107853 (entitled "SYSTEM FOR ENHANCING POWER TOOLS"; filed on Mar. 15, 2013), U.S. Pat. No. 6,876,173 (entitled "BATTERY ADAPTER FOR A CORDLESS POWER TOOL SYSTEM AND RELATED METHOD"; filed Feb. 11, 2004) and U.S. Pat. No. 7,443,137 (entitled "ADAPTER FOR A POWER TOOL BATTERY"; filed Dec. 12, 2006) are incorporated herein by reference. Accordingly, persons skilled in the art shall recognize that adapter 1000 can be used to enhance an electrical component (such as a radio, audio device or flashlight, usable with a power tool battery pack), a non-motorized sensing tool and/or a portable power source.

Persons skilled in the art shall recognize that power tools 200 may be a drill, a circular saw, a reciprocating saw, a jigsaw, a miter saw, a table saw, etc., which are connectable to power tool battery packs 100. Persons skilled in the art shall understand that "battery pack" and "power tool battery pack" as used herein shall mean a set of rechargeable battery cells (not shown) disposed in a housing 101 for use with a power tool that is powered by an electrical motor, such as a drill 200, circular saw, reciprocating saw, jigsaw, etc. Persons skilled in the art shall recognize that power tool battery pack 100 may be the power tool battery packs disclosed in U.S. Pat. Nos. 7,405,536, 7,618,741, 7,602,146 and/or 8,044,640, which are hereby incorporated in full by reference. A charger 210 may be used for charging power tool battery packs 100. Such charger 210 may be a radio charger disclosed in U.S. Pat. No. 6,308,059, which is hereby incorporated in full by reference.

Adapter 1000 preferably has a housing 1001. Housing 1001 preferably supports a first set of electrical terminals 1002 which are electrically connectable to the terminals 200T of a power tool 200, a charger 210, a non-motorized sensing tool and/or a portable power source, etc.

In addition housing 1001 preferably has a connection configuration 1003 for physically connecting housing 1001 to the power tool 200, charger 210, non-motorized sensing tool and/or a portable power source, etc. As shown in FIGS. 1 and 4-5C, power tool 200 and charger 210 preferably have at least one groove 200G, 210G for receiving a rail 1003R of housing 1001.

Such arrangement is commonly referred to as a "slide-on" or "sliding rail" configuration. Persons skilled in the art will recognize that the connection configuration 1003 may be altered as necessary in order to be able to physically connect housing 1001 to the power tool 200, charger 210, non-motorized sensing tool and/or a portable power source, etc. in a "tower" configuration. Such "tower" configuration is shown and described in U.S. Pat. Nos. 5,144,217 and 7,443,137, which are incorporated herein by reference.

Persons skilled in the art will recognize that adapter 1000 can be used to connect a power tool 200, charger 210, etc.

having a first configuration, such as a slide-on configuration, with a battery pack 100 having a second configuration, such as a slide-on configuration with different dimensions (e.g., longer rails, narrower distance between rails, etc.) or a tower configuration, or vice versa. Persons skilled in the art shall also recognize that adapter 1000 may be used to connect battery packs 250 from a first company, such as Makita battery packs, with power tools 200 from a second company, such as Milwaukee or Ridgid power tools.

Housing 1001 preferably supports a second set of electrical terminals 1004 which are electrically connectable to the terminals 102 of the power tool battery pack 100. In addition housing 1001 preferably has a connection configuration 1005 for physically connecting housing 1001 to the power tool battery pack 100. As shown in FIGS. 1-5C, housing 1001 preferably has at least one groove 1005G receiving a rail 103R of power tool battery pack 100.

Persons skilled in the art will recognize the connection configuration 1005 to be a "slide-on" or "sliding rail" configuration. Nonetheless, persons skilled in the art will recognize that the connection configuration 1005 may be altered as necessary in order to be able to physically connect housing 1001 to a power tool battery pack 100 that has a "tower" configuration. Such "tower" configuration is shown and described in U.S. Pat. Nos. 5,144,217 and 7,443,137, which are incorporated herein by reference.

It may be desirable to semi-permanently or permanently attach adapter 1000 to power tool 200, charger 210, non-motorized sensing tool, a portable power source and/or power tool battery pack 100.

Referring to FIGS. 3A-3C, in one embodiment, adapter 1000 can be semi-permanently or permanently attached to power tool battery pack 100 by sliding adapter 1000 along direction A. Once adapter 1000 has been placed in the desired position, screws 1006B may be inserted through holes 1006 on adapter 1000 to threadingly engage the housing 101 of power tool battery pack 100. Screws 10068 may be regular screws.

Alternatively screws 1006B may be break-away screws or bolts that have a head 1006BH that separate from screws 1006B once a certain torque has been reached. Persons skilled in the art will recognize that, after the heads 1006BH are separated from screws 1006B, it would be very difficult to remove screws 1006B from housing 101.

The adapter/power tool battery pack combination can then be removably coupled to a power tool 200, charger 210, etc. Persons skilled in the art will recognize that power tool battery packs 100 may have a latching mechanism for latching and/or fixing the power tool battery pack 100 to the power tool 200.

For example, referring to FIGS. 3A-3B and 4-5B, power tool battery pack 100 may have a latching mechanism 105, with a spring-biased latch 105L that may engage a slot 200S in power tool 200. As is well known in the art, the latch 105L may be biased towards a first position engaging the slot 200S. Such engagement preferably fixes the position of power tool battery pack 100 relative to power tool 200.

The latch 105L may be moved to a second position not engaging the slot 200S via moving the button 105B. When latch 105L is in the second position, power tool battery pack 100 may be disengaged from power tool 200.

Because adapter 1000 may cover latch 105L (and/or receive latch 105L in a slot 1001S), it may be desirable to provide adapter 1000 with a latching mechanism 1007 so that the adapter/power tool battery pack combination may be latched unto the power tool 200. Referring to FIGS. 1 and 3A-3B, the latching mechanism 1007 may include a latching assembly 1007A, which may be inserted into a channel 1007C of housing 1001.

Latching assembly 1007 may have a latch 1007L, which would exit an opening 1007O on housing 1001 in order to engage slot 200S of power tool 200 (and thus latching the adapter/power tool battery pack combination). Latch 1007L is movable between a first position engaging the slot 200S (thus fixing the position of the adapter/power tool battery pack combination relative to power tool 200) and a second position not engaging the slot 200S (thus allowing the user to remove the adapter/power tool battery pack combination from power tool 200).

Preferably latch 1007L is biased towards the first position via a spring 1007S. Latch 1007L is connected to a connector or wire 1007W, which is in turn connected to a movable button 1007B. With such arrangement, the user can move the latch 1007L towards the second position by moving button 1007B.

Preferably latch 1007L is rotatably attached to latch assembly 1007A. With such arrangement, the user would move button 1007B, thus moving latch 1007L towards a retracted position, allowing the user to insert the latch assembly 1007A into channel 1007C. The user would then release the button 1007B and latch 1007L would rotate towards the first position out of opening 1007O.

To attach such adapter 1000 to power tool battery pack 100, the user would dispose the housing 1001 on power tool battery pack 100, then move button 1007B, thus moving latch 1007L towards a retracted position, allowing the user to insert the latch assembly 1007A into channel 1007C. The user would then release the button 1007B and latch 1007L would rotate towards the first position out of opening 1007O. Screws 1006B can then be inserted through holes 1006 on adapter 1000 and holes 1007H on latch assembly 1007A to threadingly engage the housing 101 of power tool battery pack 100.

Figure 4:
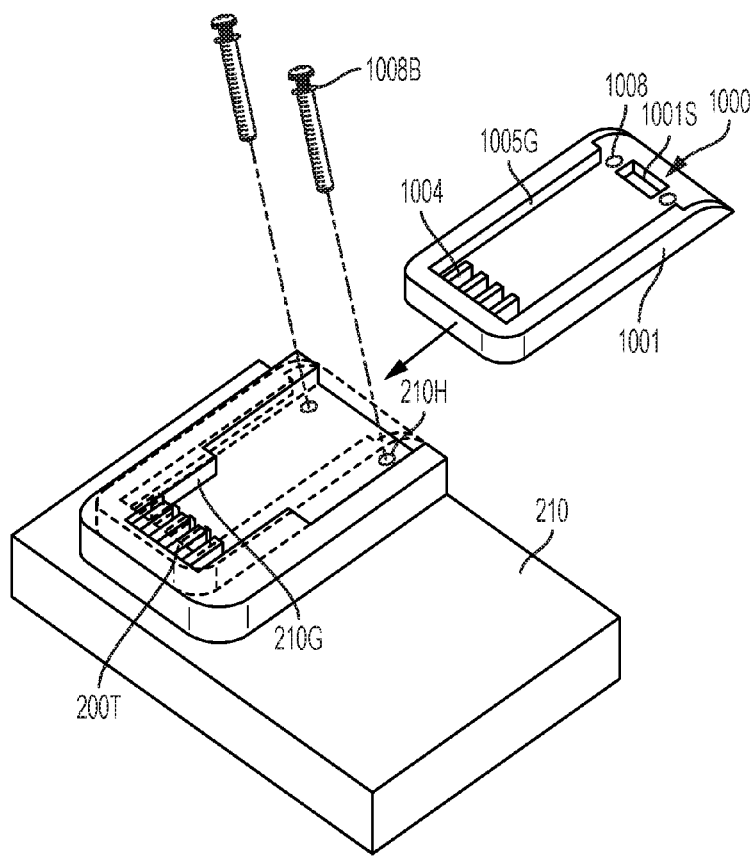
FIG. 4 is a perspective view showing the adapter of FIG. 1 being installed on a power tool battery pack charger.

Referring to FIG. 4, in another embodiment, adapter 1000 can be permanently or semi-permanently attached to charger 210. Persons skilled in the art will recognize that charger 210 may have a connection configuration, such as a slide-on/sliding rail or tower configuration. Adapter 1000 would have a corresponding connection configuration in order to physically and electrically connect adapter 1000 to charger 210.

Once adapter 1000 has been placed on charger 210 in the desired position, screws 1008B may be inserted through holes 1008 on adapter 1000 to threadingly engage the housing (and/or holes 210H) of charger 210. Screws 1008B may be regular screws or break-away screws.

A battery pack 100 can then be connected to the charger/adapter combination. Persons skilled in the art will recognize that adapter 1000 will have a connection configuration that can cooperate with the connection configuration of battery pack 100 so that battery pack 100 can be physically and electrically connected to adapter 1000.

Figure 5A:
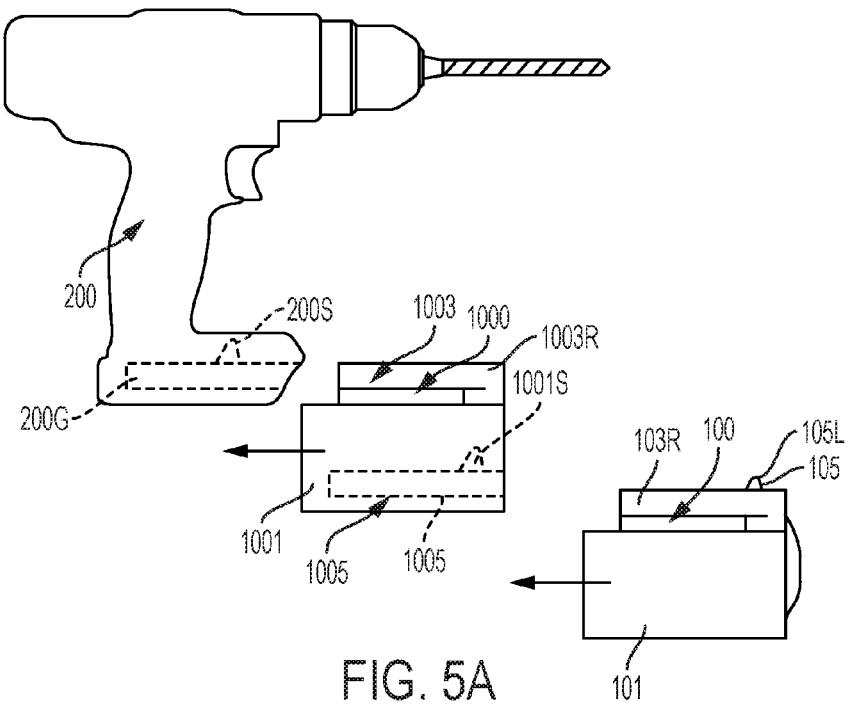
FIG. 5A is a side view showing the adapter of FIG. 1 being installed on a power tool.
Figure 5B:
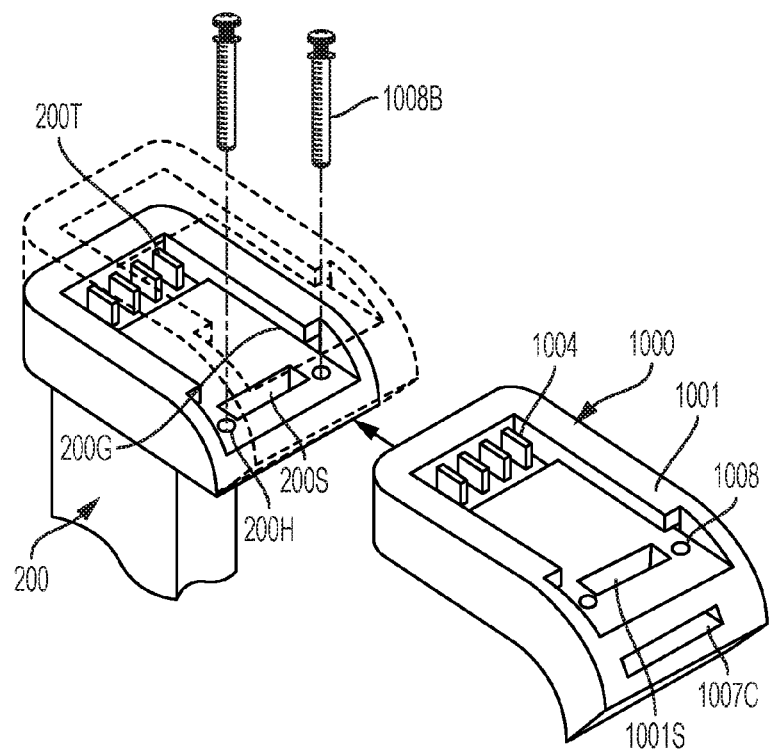
FIG. 5B is a bottom perspective view showing an installation step for installing the adapter of FIG. 5A on a power tool.
Figure 5C:
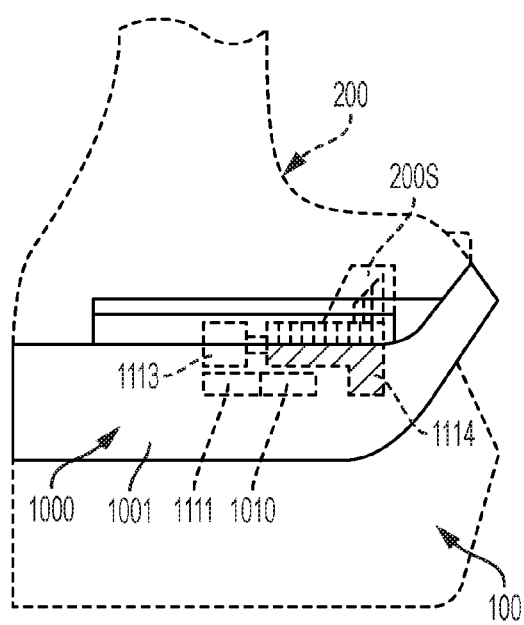
FIG. 5C is a partial side view showing an installation step for installing an alternative adapter on a power tool.

Referring to FIGS. 5A-5B, in another embodiment, adapter 1000 can be disposed on power tool 200. Persons skilled in the art will recognize that power tool 200 may have a connection configuration, such as a slide-on/sliding rail or tower configuration. Adapter 1000 would have a corresponding connection configuration in order to physically and electrically connect adapter 1000 to power tool 200.

Once adapter 1000 has been placed in the desired position, screws 1008B may be inserted through holes 1008 on adapter 1000 to threadingly engage the housing (and/or holes 200H) of power tool 200. Screws 1008B may be regular screws or break-away screws.

A battery pack 100 can then be connected to the power tool/adapter combination. Persons skilled in the art will recognize that adapter 1000 will have a connection configuration that can cooperate with the connection configuration of battery pack 100 so that battery pack 100 can be physically and electrically connected to adapter 1000.

Persons skilled in the art will recognize that latching assembly 1007A may not be installed when adapter 1000 is disposed on power tool 200 or charger 210 because the power tool battery pack 100 carries the latch 105L which will engage slot 1001S of adapter 1000.

Persons skilled in the art shall recognize that the adapter 1000 can be disposed on power tool 200, charger 210, power tool battery pack 100, etc. by attaching adapter 1000 to the housings of power tool 200, charger 210, power tool battery pack 100, etc.

Figure 2:
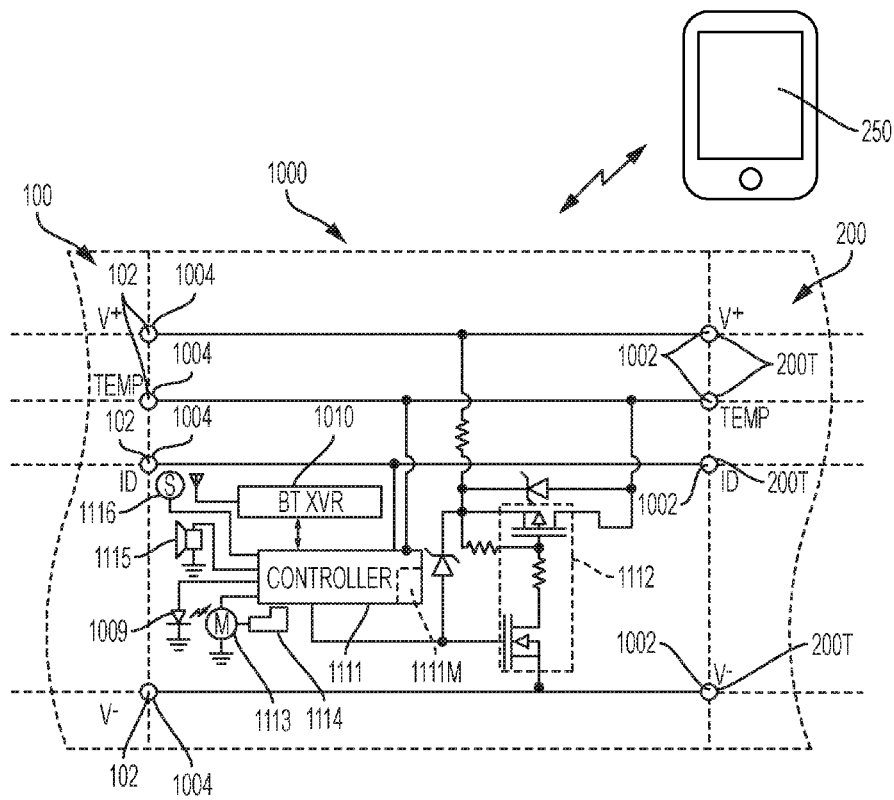
FIG. 2 is a partial schematic drawing of the adapter of FIG. 1.

Referring to FIG. 2, adapter 1000 may communicate with a computing device 250, such as a personal computer, tablet, mobile telephone, smartphone, etc. Such communication may be done via a wireless communication circuit 1010, which may be a BlueTooth® transceiver. Alternatively, the wireless communication circuit 1010 may send signals in other wireless communication protocols, such as Wi-Fi, Zigbee, etc. Persons skilled in the art will recognize that the wireless communication circuits 1010 and/or other circuits within adapter 1000 may be powered by the power tool battery pack 100 connected to adapter 1000. Alternatively, adapter 1000 may have a battery cell, such as a coin cell or rechargeable cell, for powering such circuits.

Computing device 250 is preferably connectable to a server (not shown) via the Internet. Persons skilled in the art will recognize that computing device 250 preferably connects to the Internet via a wireless communication circuit/protocol, such as Wi-Fi, Bluetooth, Zigbee, 3G/4G data systems, etc.

FIG. 2 shows a schematic circuit diagram of one embodiment of the adapter 1000 electrically connected to a power tool 200 and a power tool battery pack 100. As mentioned above, adapter 1000 has terminals 1002, 1004 that electrically connected the terminals 102 of power tool battery pack 100 and the terminals 200T of power tool 200, respectively. Adapter 1000 may have terminals 1002, 1004 that correspond to the positive (V+), negative (V−), temperature (TEMP) and/or identification (ID) terminals 102 of power tool battery pack 100 and/or corresponding terminals 200T of power tool 200.

Persosn skilled in the art will recognize that adapter 1000 may be a pass-through adapter without any power transistors, connecting the positive and negative terminals (V+, V−) 102 of a battery pack 100 to the positive and negative terminals (V+, V−) 200T of a power tool 200 (or charger 210). Adapter 1000 may also have some switching circuit 1112, as further described below, for enabling and/or disabling the current flow between the positive and negative terminals (V+, V−) 102 of battery pack 100 and the positive and negative terminals (V+, V−) 200T of power tool 200 (or charger 210).

Wireless communication circuit 1010 may be connected to the positive (V+), negative (V−), temperature (TEMP) and/or identification (ID) terminals 1002, 1004, so that it can be powered by the power tool battery pack 100. Wireless communication circuit 1010 may be connected to a controller circuit 1111, such as a microprocessor, that can receive inputs from the wireless communication circuit 1010, etc., and provide different outputs for controlling and effecting different functions. For example, controller 1111 may control a switching circuit 1112, a visual display such as a screen, an LCD and/or an LED 1009, a speaker 1115, a motor 1113, and/or a lock 1114 in a manner further discussed below.

Controller 1111 may also have at least one sensor 1116 to provide different inputs. The sensor(s) 1116 may provide information to controller 1111 for controller 1111 to analyze, act upon and/or transmit to computing device 250 for analysis, triggering some particular action and/or transmitting to another.

For example, sensor 1116 could be a microphone for capturing and/or transmitting sounds, noise or voice, for documenting noise exposure, etc. Such functionality would allow the user to modify tool/product operation with voice commands. Alternatively, if adapter 1000 and/or computing device 250 identify a particular sound and combine such data with the data of other sensors, for example, sound plus a particular accelerometer position, the adapter 1000 and/or computing device could use that information to identify a particular type of work, and then control adapter 1000 and/or the product connected thereto to enhance, modify or facilitate such work.

Similarly, if sensor 1116 is a piezo sensor, it can be used to detect and monitor vibration. Adapter 1000 and/or computing device 250 for example could keep track of such vibration data and provide an alarm when a certain vibration amplitude threshold has been reached and/or vibration time period has elapsed. Persons skilled in the art will recognize that adapter 1000 and/or computing device 250 could also maintain a record of such vibration for compliance documentation purposes. Finally, a piezo sensor could also be used as a type of sound-generating device for transmitting alarm sounds, etc.

If sensor 1116 is an accelerometer, gyroscopic or other inertial sensor, such sensor can be used to monitor particular movements, operational patterns, gestural movements, and/or inactivity. Such data could be used to modifying tool or product parameters or operations (such as turning on/off the product) via movement/gesture commands.

If sensor 1116 was a capacitive sensor, it could be used to detect adapter 1000 being touched by a human, for example. Such detection could be used to detect and/or document activity status (e.g., in-use/standby) and/or use data. If multiple capacitive sensors 1116 were provided, controller 1111 would be able to identify the motion of a finger swipe between sensors, allowing the user to modulate tool speed, power, etc., for example.

If sensor 1116 was a torque sensor (whether a mechanical sensor or an electric sensor that calculated torque by the amplitude of the drawn current), adapter 1000 and/or computing device 250 could monitor and/or document the torque applied to fasteners. Such data can then be saved in computing device 250 for code compliance documentation. Such data can also be used to control the tool to ensure a particular torque threshold is not exceeded.

If sensor 1116 is a current sensor, speed sensor or tachometer, adapter 1000 and/or computing device 250 could monitor, control and document tool use, including keeping track of tool lifespan statistics. For example, adapter 1000 could ensure that power tool 200 does not exceed a particular speed threshold.

If sensor 1116 was a hygrometer, adapter 1000 and/or computing device 250 could be used to monitor the ambient atmospheric humidity, thus monitoring and/or documenting the environmental conditions in which the power tool 200 (or other product) is being used in. Adapter 1000 and/or computing device 250 could modify tool operation as necesary to better operate in the detected environment. Adapter 1000 and/or computing device 250 could signal the user via a sound and/or visual alarm of an extreme condition, and even turn off the power tool 200.

If sensor 1116 is a carbon monoxide, smoke, caustic chemical, radiation and/or explosive gas sensor, adapter 1000 and/or computing device 250 could be used to monitor and/or document the environmental conditions in which the power tool 200 (or other product) is being used in. Adapter 1000 and/or computing device 250 could modify tool operation as necesary to better operate in the detected environment. Adapter 1000 and/or computing device 250 could signal the user via a sound and/or visual alarm of an extreme condition, and even turn off the power tool 200.

Similarly, if sensor 1116 is a temperature or infrared sensor, adapter 1000 and/or computing device 250 could be used to monitor the ambient temperature and/or temperature of specific items, such as a workpiece being worked upon. Adapter 1000 and/or computing device 250 could signal the user via a sound and/or visual alarm of an extreme temperature, and even turn off the power tool 200.

If sensor 1116 is an ultraviolet sensor, adapter 1000 and/or computing device 250 could be used to detect a target or work material that may be difficult to see with the naked eye. Adapter 1000 and/or computing device 250 could also signal the user via a sound and/or visual alarm of a hazardous condition, and even turn off the power tool 200.

If sensor 1116 is an altimeter, adapter 1000 and/or computing device 250 can modify tool performance taking into account the altitude. Adapter 1000 and/or computing device 250 could also signal the user via a sound and/or visual alarm of a hazardous condition, and even turn off the power tool 200. Persons skilled in the art will recognize the altitude data could be used in locating adapter 1000, for example, as it would assist in identifying the floor in which adapter 1000 may be located.

If sensor 1116 is a laser distance measurer, adapter 1000 and/or computing device 250 can modify tool performance taking into account the distance between the power tool 200 and the work surface. For example, if power tool 200 is a drill, the adapter 1000 can measure the distance between the drill and the surface being drilled. As the user pushes the drill further into the work surface, the laser distance measurer can provide further distance measurements, allowing the laser distance measurer, the adapter 1000 and/or the computing device 250 to calculate the depth of cut. If the user has inputted a desired depth of cut, the adapter 1000 and/or the computing device 250 can slow down or turn off the drill when desired depth of cut is reached. The depth of cut information could be displayed on computing device 250 and/or display 1009 of adapter 1000.

Sensor 1116 could also be a camera. Photo and/or video data sent from adapter 1000 could be viewed on computing device 250. Such image data can be used by the user to adjust tool performance or to view a hazardous condition. If the computing device 250 has image recognition software, the computing device 250 can instruct adapter 1000 to turn off the power tool 200 in the event of a hazardous condition.

If sensor 1116 is an ultrasonic sensor, such sensor would provide a signal indicative of the density of the workpiece or surface being worked upon. Adapter 1000 and/or computing device 250 can modify tool performance taking into account such density. Adapter 1000 and/or computing device 250 could also signal the user via a sound and/or visual alarm of a hazardous condition, and even turn off the power tool 200.

Further details on such arrangement can be found in U.S. Pat. No. 7,540,334, which is hereby incorporated by reference.

Figure 6:
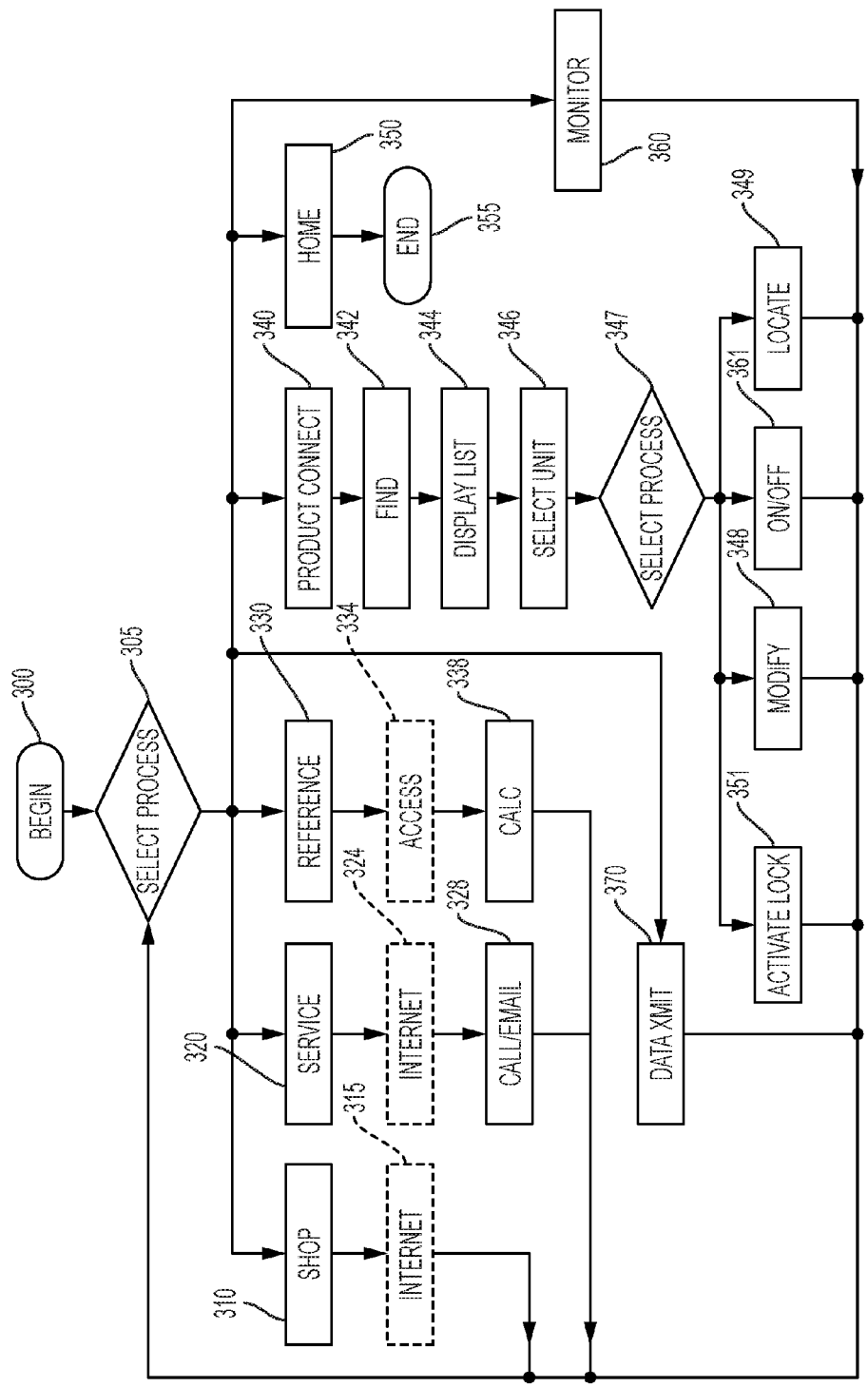
FIG. 6 is a flowchart of different exemplary process that can be performed by the system.

Computing device 250 and/or controller 1111 may have a program or app that implements the steps shown in the flowchart of FIG. 6. A user may begin the program at step 300 by, for example, selecting the appropriate app/program on her computing device 250. Alternatively, the program or app can begin automatically upon connection with or request from the adapter 1000. Persons skilled in the art will recognize that some of the steps shown in FIG. 6 may be carried out by computing device 250 while other steps may be carrried out by controller 1111.

In response to such selection, computing device 250 may show several process choices for the user to select (step 305). These process choices may include shopping for tools or related products (step 310), obtaining service information (step 320), refer to construction reference materials (step 330), connect to nearby power tools or products (step 340), or go back to a home menu to end the app (step 350).

For example, if the user selects the shopping process (step 310), computing device 250 may communicate with a server via the internet (step 315) that would provide the user information on the different available products, as well as allow the user to shop online for such products. Persons skilled in the art may recognize that the computing device 250 may use GPS or cell-location data to identify the closest stores carrying the desired products.

If the user selects the service process (step 320), computing device 250 may communicate with a server via the Internet (step 324) that provides the user information on the different available services, including the closest repair/service center, contact information, etc. Persons skilled in the art may recognize that the computing device 250 may use GPS or cell-location data to identify the closest repair/service center. The user can then call or email the repair/service center (step 328) to schedule an appointment. Persons skilled in the art are further referred to U.S. Publication No. 2013/0159038, filed on Dec. 11, 2012, entitled "System and Method for Interacting With Customer," which is fully incorporated herein by reference, for further details on the service process.

Persons skilled in the art will recognize that computing device 250 may transmit data to the repair/service center about power tool battery pack 100, power tool 200, charger 210, etc., such as cycle numbers, clutch activation count, current draw profiles, and other usage data. Such data can be obtained by the controller 1111 querying power tool battery pack 100, power tool 200, charger 210, etc., then receiving the data from the power tool battery pack 100, power tool 200, charger 210, etc., and then transmitting the data to computing device 250.

Similarly, computing device 250 can transmit such data to other destinations, such as a supervisor's computing device, to alert the supervisor of a user's use or abuse of a power tool battery pack 100, power tool 200, charger 210, etc. Such data can be used to monitor the user's productivity.

Persons skilled in the art will recognize that the computing device 250 could be used to record noises originating from power tool 200 and send those noises to the repair/service center for diagnosis of the power tool 200. The app could also analyze the noises and provide some troubleshooting advice for power tool 200.

If the user selects the reference process (step 330), the app would access data stored in memory (step 334). Persons skilled in the art will recognize that the memory could be within or without computing device 250. Such data could include reference materials, such as handbooks on different construction techniques, the different construction codes, such as the International Building Code, the International Residential Code, the International Plumbing Code, etc., as well as computer-aided design (CAD) data and/or building information modeling (BIM) data models of the worksite. The data could also include other executable routines, like calculator code for converting measurements between different units (e.g., converting feet to meters), calculating stair rise run, baluster spacing, roof pitches, HVAC calculations, etc., as well as different cost estimation tools, landscaping tools, etc.

The user can also choose to connect/pair to nearby power tools, battery packs or other products (step 340). If such process is selected, computing device 250 would proceed to wirelessly contact all nearby power tools, battery packs and other products (step 342). Once contact has been made, computing device 250 would display a list of nearby power tools, battery pack and other products (step 344).

It may be preferable to color-code the different listed power tools, battery pack and other products. For example, tools that are owned (or paired) with the user can be shown in green. Tools that can't be contacted or accessed by the user can be shown in red. Tools that are owned by colleagues or a group are shown in yellow. Tools that have not been associated with a particular user can be shown in white.

Similarly, persons skilled in the art will recognize that computing device 250 may show a list of previously-paired power tools, power tool battery packs and other products, and show the ones that are nearby in one color, while showing the others in another color. In this manner, the user will know which power tools, power tool battery packs and other products are within a certain radius, thus conducting a quick inventory check.

The user can then select a particular adapter connected to a power tool, battery pack or other product (step 346). Once a particular adapter 1000 associated with power tool, power tool battery pack or other product is selected, computing device 250 can display different attributes for such product for review. For example, in the case of power tool battery pack100, some of the attributes can include an identifying name (e.g., "Danny's Pack 1"), a picture icon, device model, the charge status, password (for accessing the tool information through another user's phone), temperature, number of charge cycles, etc. Persons skilled in the art will recognize that this information is kept in a memory 1111M of the adapter 1000, which is then transmitted via the wireless communication circuit 1010 to computing device 250, possibly upon a direct request from computing device 250.

Persons skilled in the art will recognize that some of the attributes can be modified. For example, the identifying name and the picture icon can be modified by the user by selecting a modification process (steps 347, 348) and inputting the new information. This data can then be wirelessly transmitted to the adapter 1000 for storage within a memory 1111M. Persons skilled in the art will recognize that the user can input the new information (as well as other commands, etc.) via a keyboard or touchscreen in computing device 250 and/or by giving verbal commands which are recognized by the computing device 250.

In addition to modifying data related to the identification of the power tool battery pack 100, for example, a user can modify data related to the performance of power tool battery pack 100 via computing device 250. For example, the user may want to change a temperature threshold at which power tool battery pack 100 completely cut offs output power. In other words, rather than cutting off power when the power tool battery pack has a temperature of 100°, the user may wish to change the cut off temperature to 110°.

To do so, the user may input the desired cut off temperature into computing device 250. Computing device 250 wirelessly sends that data to adapter 1000, which in turn sends the data to the power tool battery pack 100, via the terminals 1004. Persons skilled in the art will recognize that modification data may be provided to power tool 200 and/or charger 210 in a similar manner, i.e., by computing device 250 wirelessly sending such data to adapter 1000, which in turn forwards the data to the power tool 200 and/or charger 210 via the terminals 1002.

The user may also program the adapter 1000 to announce when the associated power tool battery pack 100 is at full charge. This announcement can be communicated via the display of computing device 250, haptic feedback of computing device 250, and/or sound emitted by the computing device 250 and/or transmitted via a speaker or piezo 1115, and/or by flashing LED 1009 of adapter 1000.

Similarly, the user can program adapter 1000 to announce when power tool battery pack 100 is near discharge, when it is hot, etc. Persons skilled in the art will recognize that this can be accomplished by adapter 1000 querying power tool battery pack 100 and/or monitoring the data transmitted along the ID and TEMP terminals 102, for example. Such data can then be transmitted to computing device 250 for display. An announcement can also be communicated via sound emitted by the computing device 250 and/or transmitted via a speaker or piezo 1115, or via a flashing LED 1009 of adapter 1000.

The user can also disable (and enable) the adapter 1000 pack 100 via computing device 250, affecting the power tool battery pack's 100 ability to provide power to a power tool 200 and/or to receive power from a charger 210 for charging. The ability (or inability) to provide power to a power tool 200 can be enabled or disabled by controller 1111 setting a power transistor (not shown) along the V+ and/or V− line within adapter 1000 in an on- or off-state, allowing power to go through adapter 1000.

Alternatively controller 1111 may use switching circuit 1112 to provide a signal that the power tool battery pack 100 is above a desired temperature threshold, which would be received by power tool 200. In response to such signal, power tool 200 would turn its motor off, until the switching circuit 1112 provides a different signal.

If power tool 200 is programmed to work with only battery packs that have a certain ID or capacity, controller 1111 could emit a signal signifying that the battery pack 100 has a ID or capacity other than the ID or capacity required by power tool 200. In such manner power tool 200 would be fooled to shut down or stop functioning, until controller 1111 sends a different ID or capacity message.

Similarly, the ability (or inability) to receive charging power to charge power tool battery pack 100 can be enabled or disabled by controller 1111 setting a power transistor (not shown) in adapter 1000 in an on- or off-state, allowing power to go through adapter 1000. Alternatively controller 1111 may use switching circuit 1112 to provide a signal that the power tool battery pack 100 is above a desired temperature threshold, which would be received by charger 210. In response to such signal, charger 210 would stop the charging process, until the switching circuit 1112 provides a different signal.

(Persons skilled in the art will recognize that this could effectively function as a remote on/off switch (step 361), where the user can turn on/off the power tool 200, etc. by touching the screen of the computing device 250.)

The user can also program adapter 1000 so that it is only enabled (and thus allowing power therethrough for powering a power tool 200 or for charging a power tool battery pack 100) when it is within vicinity of computing device 250. This can be accomplished by computing device 250 sending a ping signal to adapter 1000. If adapter 1000 receives the ping signal, then adapter 1000 continues to allow power therethrough. However, if adapter 1000 does not receive a ping signal for a predetermined period of time, adapter 1000 can assume that it is outside of communication range with computing device 250 and disable itself (thus not allowing power therethrough).

Similarly, a power tool 200 and/or chargers 210 connected to an adapter 1000 may also be contacted via computing device 250. For example, power tool 200 can store tool usage patterns, tool conditions, etc., which can be transmitted via adapter 1000 to computing device 250 and to a server for further analysis, etc. As disclosed above, computing device 250 can display such information. For example, computing device 250 can display the speed (rpm), bevel angles, miter angles, brush wear, the presence or condition of a guard and/or attachment, etc. of the power tool 200.

Like power tool battery pack 100, power tool 200 may effectively be programmed to change different attributes or features. For example, a user can set the maximum motor speed or power, or provide a predetermined output (such as half the motor speed or power) when not within the vicinity of computing device 250, etc. Similarly, it may be desirable to control any adjustable feature in a power tool 200 via computing device 250. For example, the computing device 250 may adjust output pressure in compressors, the amount of grease outputted by a grease gun when the trigger is pulled (persons skilled in the art will recognize that computing device 250 can set a grease gun's pump to run for X pump cycles whenever the trigger is pulled; the higher the number of pump cycles per trigger pull, the larger the amount of grease outputted), the speed of a flywheel-based nailer (such as the one disclosed in U.S. Pat. No. 7,137,541, which is wholly incorporated herein by reference) in order to adjust for a different nail size or material in which the nail is being driven into, or a desired temperature for a heated jacket (such as the one disclosed in US Publication No. 2011/0108538, which is wholly incorporated herein by reference). Such data can be transmitted by computing device 250, received by adapter 1000 and then forwarded to power tool 200 via the ID and/or TEMP lines, for example.

The user can also enable and disable different modes of operation, such as allowing/not allowing power tool 200 to rotate in a reverse direction. As mentioned above, the user can enter such commands via a keyboard or touchscreen on computing device 250 and/or by providing verbal commands recognized by computing device 250.

Alternatively, computing device 250 can be used to determine the appropriate attribute or feature to modify. For example, computing device 250 can scan a visual code (such as a bar code or QR code) on an accessory, such as a grinding wheel, via its camera, determine the identity of the accessory and modify the attributes of the power tool 200 via adapter 1000 accordingly. In such manner, computing device 250 can determine that, for example, a small grinding wheel has been installed on grinder/power tool 200 and that the maximum speed should be 10000 rpm. Computing device 250 would then transmit to adapter 1000 the instruction that grinder/power tool 200 cannot exceed such maximum speed. Adapter 1000 would provide this instruction to power tool 200 via the ID and/or TEMP lines, for example. This would allow a user to use a grinder as a polisher (and vice versa) by selecting the appropriate speed for the desired accessory.

Computing device 250 may also be used to modify the different trigger profiles of power tool 200 as described in US Publication No. 2011/02544272, filed on Apr. 7, 2011, entitled "Power Tool Having a Non-Linear Trigger-Speed Profile," which is hereby fully incorporated by reference. A user can use computing device 250 to select between the different trigger profiles applicable to power tool 200. Alternatively, the user can use computing device 250 to program a customized trigger profile. Such data would be sent to adapter 1000, which would then provide this instruction to power tool 200 via the ID and/or TEMP lines, for example.

Other customizable features on power tools and other products may include the blink patterns of LEDs, the time period that an LED remains on after releasing a trigger switch, audio beeping patterns for particular conditions in products with speakers or piezos, the selected radio station and/or volume on a radio charger 210, etc. The app can also turn on and off the power tool 200 or accessories thereof like a dust collector, open/close gates therein, etc. Such data would be sent to adapter 1000, which would then provide this instruction to power tool 200 (and/or charger 210) via the ID and/or TEMP lines, for example, or by turning on/off power to power tool 200 as discussed above.

If the power tool 200 has servos that can be used to adjust different features of power tool 200 (such as the miter saw disclosed in US Patent Publication No. 2001/0000856, filed on Jan. 5, 2001, and wholly incorporated herein by reference), the app can be used to adjust the different features by controlling the servos. For example, the user can select a bevel angle on the computing device 250 and the app will control the bevel angle servo to the desired location. In this manner, the user can program a list of desired workpieces, i.e., a cut list, and the app can control the miter saw/power tool 200 to obtain those cuts. Similarly, the servos can be used to adjust the stroke length in a saw that allows for such adjustment, such as in reciprocating saws or jigsaws. Persons skilled in the art will recognize that such data would be sent to adapter 1000, which would then provide this instruction to power tool 200 (and/or charger 210) via the ID and/or TEMP lines, for example, or by turning on/off power to power tool 200 as discussed above. A sensor monitoring the servo positions could relay information to adapter 1000 via the ID and/or TEMP lines, for example, which would then be analysed and acted upon by controller 1111, and/or sent to computer device 250 for analysis and further commands.

It may be beneficial to provide servos to perform functions that are difficult to do, like opening a blade clamp on a grinder or a recip saw. Rather than requiring the user to torque open a blade clamp, the user would select such operation in the app.

Furthermore, a user can also use computing device 250 and adapter 1000 to locate the selected power tool 210, battery pack 100 or other product (step 349). Due to the wireless communication between computing device 250 and adapter 1000, it is possible to send a command from computing device 250 to adapter 1000 to start emitting a sound via speaker/piezo 1115 (and/or light up or flash LED 1009), so as to assist in locating such adapter 1000 (and thus the connected power tool 200, charger 210 and/or battery pack 100). Similarly adapter 1000 can send a command to power tool 200 via the ID and/or TEMP lines, for example, to light up or flash any LED on power tool 200.

Persons skilled in the art will recognize that adapter 1000 may be used in a mesh network to locate a power tool 210, battery pack 100 or other product. Such mesh network is described in US Publication No. 2014/0213301, which is hereby incorporated by reference. In such mesh network, if adapter 1000 cannot communicate with computing device 250, because adapter 1000 is too far from computing device 250, adapter 1000 may communicate with a second computing device 250 which has compatible software. The second computing device 250 can notify a server of the computing device 250's location (obtained by noting the geolocation of comuting device 250 via its GPS functionality or any other location systems), which in turn can relay such locational data to the first computing device 250. The user of the first computing device 250 can enable or disable the adapter 1000 as desired, or use the locational data to find adapter 1000 and the product attached thereto. The user may pass along such locational data to a security organization, jobsite security and/or the police, if the adapter 1000 and the product attached thereto are believed to have been stolen. If adapter 1000 has a camera (as a possible sensor 1116), the user may instruct via the first computing device 250 for the adapter 1000 and/or the second computing device 250 to take a photograph of the area for further documentation of the possible theft.

It is also possible to have the computing device 250 poll all nearby battery packs 100 via adapters 1000 for a particular state. Thus computing device 250 can determine the battery pack 100 with the highest/lowest charge, highest/lowest temperature, most charge cycles, etc., then send a command to the corresponding adapter 1000 to start emitting a sound.

A user can also use computing device 250 and adapter 1000 to activate a lock (step 351) locking adapter 1000 to a selected power tool 200. As mentioned above, controller 1111 can control a motor 1113 on adapter 1000. Motor 1113 may be connected to a lock 1114 which is movable between a first position engaging slot 200S (shown in vertical lines in FIG. 5C) thus locking adapter to power tool 200, and a second position not engaging slot 200S (shown in diagonal lines in FIG. 5C), allowing the user to remove adapter 1000 and power tool battery pack 100 from power tool 200. Preferably motor 1113 rotates lock 1114 between first and second positions.

The app can also monitor the battery pack 100, charger 210 and/or power tool 200 (step 360). The app can enter a monitoring state automatically and/or when selected by the user. During this monitoring process, the app and/or the adapter 1000 can keep track of power tool usage, present current draw, data received from sensors in the power tool 200 (for example pressure sensors disposed within the power tool 200), etc. and store and/or use that information for analysis by a service department. In this manner, the service department can determine whether a power tool 200 has been abused.

The app can also use that information to better utilize the power tool 200. For example, the app can receive from adapter 1000 PWM, voltage and/or current draw information from battery pack 100 and/or power tool 200 and establish a macro that would allow the user to repeat the current draw. Persons skilled in the art will recognize that such current draw profile can represent a torque curve for driving a fastener into a surface. Having a repeatable draw profile will allow the user to easily set a custom torque setting.

Persons skilled in the art will recognize that an app can be looking for similar patterns and adjust the attributes battery pack 100 and/or power tool 200 via adapter 1000 accordingly for better efficiency, effectively learning the user's use patterns. The app can do such analysis on data patterns, or even in real time. For example, the app can receive current information, trigger position and/or speed information, and run power tool 200 using that information to maximize run-time. Other information that the app can monitor includes bias force/bias load, gear settings, battery voltage, the presence of on-tool guard or side handles, etc.

Similarly, if the app monitors motor current draw and gear setting, the app can select and/or indicate the best gear ratio (or speed setting) to run at optimum efficiency. If the motor is drawing a lot of current and the transmission is set at a high speed, the app may alert the user to switch to a lower speed or may switch the gear setting automatically.

Persons skilled in the art will recognize that the adapter 1000 may effectively provide access to features in the power tool 200, charger 210, power tool battery pack 100, etc., that are not accessible without adapter 1000.

Persons skilled in the art will recognize that adapter 1000 can act as a repeater to passing along data from another adapter 1000 to computing device 250.

Similarly, adapter 1000 can act as a gateway to a web server if the wireless communication circuit 1010 includes a cellular/4G transceiver. With such arrangement, adapter 1000 can send to the web server information directly (or passing along information from another adapter 1000, power tool 200, charger 210, power tool battery pack 100, etc.) without requiring a computing device 250.

The description of the invention is merely exemplary in nature and, thus, variations that do not depart from the gist of the invention are intended to be within the scope of the invention. Such variations are not to be regarded as a departure from the scope of the invention.

What is claimed is:

1. An adapter for electrically connecting a power tool battery pack with at least one of a power tool and a power tool battery pack charger, where the power tool battery pack has a first set of terminals, and the at least one of a power tool and a power tool battery pack charger has a second set of terminals, the adapter comprising:
    a third set of terminals for electrically connecting with the first set of terminals,
    a fourth set of terminals for electrically connecting with the second set of terminals,
    a controller connected to the third and fourth set of terminals, and
    a wireless communication circuit connected to the controller for wireless communication with a computing device, the wireless communication circuit receiving data from the computing device,
    wherein the controller performs an action according to the data received from the computing device.

2. The adapter of claim 1, wherein the action performed by the controller includes at least one of the list consisting of providing data to the computing device via the wireless communication circuit, disabling at least one of the power tool battery pack, the power tool and the power tool battery pack charger, modifying an attribute of at least one of the power tool battery pack, the power tool and the power tool battery pack charger, activating a visual or audio alert, activating a motor, and retransmitting data received from another device via the wireless communication circuit.

3. The adapter of claim 1, further comprising a sensor connected to the controller.

4. The adapter of claim 3, wherein the sensor comprises at least one of the list consisting of a microphone, an accelerometer, a capactitive sensor, a torque sensor, a current sensor, a speed sensor, a tachometer, a hygrometer, a gas sensor, a carbon monoxide sensor, a smoke sensor, a caustic chemical sensor, a radiation sensor, a temperature sensor, an infrared sensor, an ultraviolet sensor, an altimeter, a laser distance measurer, a camera, and an ultrasonic sensor.

5. The adapter of claim 3, wherein the controller sends data received from the sensor to the computing device via the wireless communication circuit.

6. The adapter of claim 1, wherein the adapter is permanently attached to one of the power tool battery pack, the power tool and the power tool battery pack charger.

7. The adapter of claim 1, further comprising a latch movable between a first position engaging one of the power tool battery pack, the power tool and the power tool battery pack charger, and a second position not engaging the one of the power tool battery pack, the power tool and the power tool battery pack charger, and a spring biasing the latch towards the first position.

8. A system comprising:
a power tool battery pack has a first set of terminals;
an adapter electrically connectable to the power tool battery pack and a power tool, where the power tool has a second set of terminals, the adapter comprising:
a third set of terminals for electrically connecting with the first set of terminals,
a fourth set of terminals for electrically connecting with the second set of terminals,
a controller connected to the third and fourth set of terminals, and
a wireless communication circuit connected to the controller for wireless communication with a computing device, the wireless communication circuit receiving data from the computing device,
wherein the controller performs an action according to the data received from the computing device.

9. The system of claim 8, wherein the action performed by the controller includes at least one of the list consisting of providing data to the computing device via the wireless communication circuit, disabling at least one of the power tool battery pack and the power tool, modifying an attribute of at least one of the power tool battery pack and the power tool, activating a visual or audio alert, activating a motor, and retransmitting data received from another device via the wireless communication circuit.

10. The system of claim 8, further comprising a sensor connected to the controller.

11. The system of claim 10, wherein the sensor comprises at least one of the list consisting of a microphone, an accelerometer, a capactitive sensor, a torque sensor, a current sensor, a speed sensor, a tachometer, a hygrometer, a gas sensor, a carbon monoxide sensor, a smoke sensor, a caustic chemical sensor, a radiation sensor, a temperature sensor, an infrared sensor, an ultraviolet sensor, an altimeter, a laser distance measurer, a camera, and an ultrasonic sensor.

12. The system of claim 10, wherein the controller sends data received from the sensor to the computing device via the wireless communication circuit.

13. The system of claim 8, wherein the adapter is permanently attached to one of the power tool battery pack and the power tool.

14. The system of claim 8, further comprising a latch movable between a first position engaging one of the power tool battery pack and the power tool, and a second position not engaging the one of the power tool battery pack and the power tool, and a spring biasing the latch towards the first position.

\* \* \* \* \*